May 27, 1930. I. E. BROWN ET AL 1,760,472
CONTROL MECHANISM FOR MOVABLE ELEMENTS
Filed Aug. 26, 1929
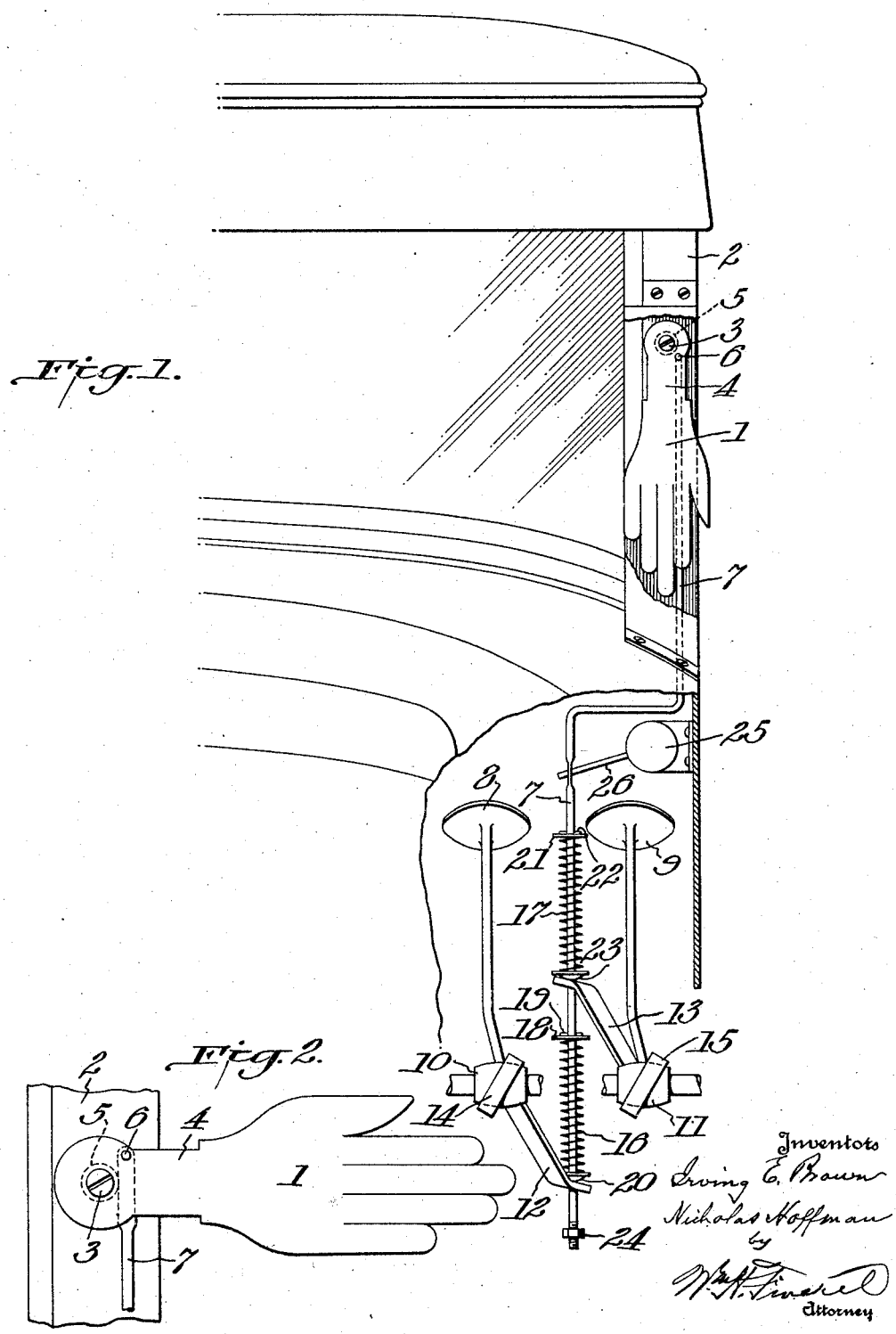

Patented May 27, 1930

1,760,472

UNITED STATES PATENT OFFICE

IRVING E. BROWN AND NICHOLAS HOFFMAN, OF PERTH AMBOY, NEW JERSEY

CONTROL MECHANISM FOR MOVABLE ELEMENTS

Application filed August 26, 1929. Serial No. 388,414.

This invention relates to a device for imparting a desired predetermined movement to a movable element such, for example, as a motion direction signal for motor vehicles; and the invention is in the nature of an improvement on the device our our Patent, No. 1,707,900, granted April 2, 1929.

Stated briefly, the invention disclosed by our patent mentioned comprises a pivoted semaphore member, preferably of a shape simulating the human hand, provided with an eccentrically connected operating rod arranged for movement by and in response to movement of a lever carried by the brake pedal of a motor vehicle, such movement acting to turn the semaphore member upon its pivot from a normally concealed position to a position such that it extends beyond the side of the body of the motor vehicle and in the line of vision of drivers of following vehicles. Inasmuch as the pivoted semaphore member is moved from concealed to visible position by a relatively slight longitudinal movement of the operating rod, a resilient lost motion connection is interposed between the pedal-operated lever and the rod, so that movement of the pedal and of the pedal-operated lever in excess of the movement necessary to change the position of the semaphore member may be taken up in the lost motion connection.

We have found it advisable, if not really essential, to provide a device of the character disclosed in our patent mentioned with means for operating it in response to actuation of either the brake pedal or the clutch pedal independently, or of both pedals simultaneously.

In making a turn, the operator of a vehicle usually depresses either the brake pedal or the clutch pedal, or both, in order to slow down his vehicle, and, if the semaphore member is connected for operation by either or both of these pedals, it is in condition to be actuated no matter which pedal is operated by the driver of the vehicle. Moreover, under existing conditions, where traffic lights are used at street intersections, and the driver of a vehicle must give some indication of his intention to make a left turn, it is essential that the semaphore member be actuated in response to operation of the clutch pedal, for the reason that, when the vehicle operator starts from a standstill or makes a shift of gears before or while making a left turn, he does not operate his brake pedal, but does operate his clutch pedal.

The invention consists in a control mechanism for movable elements, especially motion direction signals for motor vehicles, comprising a longitudinally movable rod or its equivalent, and two levers or the like cooperating with said rod but freely movable relatively thereto, whereby either may be moved independently of the other with respect to the rod, and means carried by said rod and cooperating with the levers and preferably including springs each having one of its ends acting against an abutment fixed on the rod and its other end against its respective lever, whereby either lever may, through the spring which abuts against it, operate the rod independently of and without imparting movement to the other lever, as we will proceed now to explain and finally claim.

In the accompanying drawings illustrating the invention, in the two figures of which like parts are similarly designated, Figure 1 is a fragmentary sectional front elevation of a motor vehicle of conventional type provided with the device of our invention and showing the semaphore member in normal concealed position. Fig. 2 is an enlarged fragmentary detail showing the semaphore member in extended or visible position and illustrating the arrangement of parts whereby the movement to such extended position is limited.

The hand-like semaphore member 1, is shown as pivotally mounted, preferably upon one of the front top stanchions 2 of the vehicle body by means of a cap screw 3, or the like, which passes through an extension 4 of the member 1 and through a sleeve 5, and is suitably secured to or in the stanchion 2.

Connected to the member 1 by means of a pin 6 is a rod 7 which extends downwardly into proximity to and between the brake pedal 8 and clutch pedal 9 of the vehicle. To the pedals 8 and 9 at their pivot bearings 10 and 11 are attached the levers 12 and 13, respectively, by means of clamping members 14 and 15, so that when the pedals 8 and 9 are depressed the ends of the levers 12 and 13 will be elevated.

The ends of the levers 12 and 13 are provided with any suitable openings, not shown, such as slots or forks, by which they are made to embrace the rod 7, so that the latter may be freely movable with respect to them. Movement is imparted to the rod 7 by the levers 12 and 13 through helical springs 16 and 17 respectively. The spring 16 bears at one end against a washer or collar 18 mounted on the rod 7 and held against movement upwardly thereon by means of a cotter or other set pin 19, and its other end bears against a suitably formed washer 20 which engages the rod-contacting end of the lever 12. The spring 17 bears at one end against a collar or washer 21 similar to the washer 18 and similarly fixed with respect to the rod 7 by means of a cotter or other set pin 22, and its other ends bears against a suitably formed washer 23 similar to the washer 20 and engaging the rod-contacting end of the lever 13.

As illustrated in Fig. 2, movement of the semaphore member 1 upon its pivot is limited to the horizontal position by contact of the rod 7 with the sleeve 5. It will be obvious, this being the case, that the vertical longitudinal movement of the rod in moving the semaphore member from the position illustrated in Fig. 1 to the position illustrated in Fig. 2 is relatively slight. Sufficient play is provided between the washer 18 and the rod-contacting end of the lever 13 to accommodate this movement. Similarly sufficient play is provided between the rod-contacting end of lever 12 and a nut 24 carried by the rod 7 also to accommodate this movement. Thus when either of the pedals 8 and 9 is depressed the end of its lever 12 or 13, respectively, will be elevated and the rod 7 will be moved vertically to turn the semaphore member 1 upon its pivot from the position shown in Fig. 1 to the position shown in Fig. 2, in which latter position it will be stopped by contact of rod 7 with sleeve 5. Any excess movement of the pedals will be taken up in the resilient lost motion connections provided by the springs 16 and 17.

The member 1 returns by gravity to normal, concealed position upon release of the pedals.

It will be seen by this arrangement that either pedal may, through its attached lever 12 or 13, operate the semaphore member 1 independently of the other pedal, and without in any way affecting the position of such other pedal.

If the semaphore member 1 is provided with illuminating devices, as is the case in the embodiment disclosed in our patent above mentioned, a switch 25 provided with an arm 26 actuated by the rod 7 may be used, so that at each movement of the member 1 to visible position, the switch may be operated to close a circuit through the illuminating devices, and upon return of the member 1 to concealed position, the switch may be operated to open such circuit.

We are aware that various devices have been provided whereby a rod for actuating some particular member may be operated from two separate sources. This is particularly true in devices for operating the throttle actuating rods of the carburetors of internal combustion engines, where such rods are to be operated both by an accelerator pedal and a hand lever, or by either of such instrumentalities. In such devices with which we are familiar, however, one of the operating elements is directly connected to the rod and always moves with it, and the other operates through a resilient connection. As distinguished from such devices which, obviously, would not be suitable for an installation such as that shown and described, our mechanism contemplates an arrangement whereby either operating device (brake pedal or clutch pedal) may operate the rod independently of the other, and without imparting any movement to such other, or whereby both may move the rod simultaneously in response to their simultaneous operation.

Various changes are contemplated as within the spirit of the invention and the scope of the following claims.

What we claim is:—

1. In a control mechanism for movable elements, particularly motion direction signals for vehicles, the combination with a movable element and a rod for imparting movement thereto, of two operating levers slidably engaging said rod, and connections between said levers and rod whereby either lever may impart movement to said rod independently of the other lever.

2. In a control mechanism for movable elements, particularly motion direction signals for vehicles, the combination with a movable element and a rod for imparting movement thereto, of two operating levers slidably engaging said rod, and connections between said levers and rod including resilient members each having one of its ends fixed relatively to said rod and its other end bearing against its respective lever whereby either lever may impart movement to said rod independently of the other lever.

3. In a control mechanism for movable elements, particularly motion direction signals for vehicles, the combination with a movable element and a rod for imparting movement thereto, of two operating levers slidably engaging said rod, and connections between said levers and rod including resilient members each having one of its ends fixed relatively to said rod and its other end bearing against its respective lever whereby either lever may impart movement to said rod independently of the other lever, said resilient members providing lost motion connections whereby excess movement of said levers will not be transmitted to said movable member.

4. Operating mechanism, for a motion direction signal for vehicles including a semaphore member, comprising a longitudinally movable rod for imparting signalling motion to said member, a clutch pedal and a brake pedal for said vehicle, and connections between each of said pedals and said rod including a lever operated by each pedal and a resilient member fixed at one end relatively to said rod and having its other end engaging said lever, whereby either pedal may be actuated to operate said rod independently of the other pedal and without imparting motion to such other pedal.

5. Operating mechanism, for a motion direction signal for vehicles including a semaphore member, comprising a longitudinally movable rod for imparting signalling motion to said member, a clutch pedal and a brake pedal for said vehicle, and connections between each of said pedals and said rod including a lever operated by each pedal and a resilient member fixed at one end relatively to said rod and having its other end engaging said lever, whereby either pedal may be actuated to operate said rod independently of the other pedal and without imparting motion to such other pedal, said resilient members providing lost motion connections between the levers and rod to prevent transmission of excess movement of said pedals to said semaphore member.

In testimony whereof we have hereunto set our hands this 20th day of August, A. D. 1929.

IRVING E. BROWN.
NICHOLAS HOFFMAN.